United States Patent
Yamanaka

[19]

[11] Patent Number: 5,951,462
[45] Date of Patent: Sep. 14, 1999

[54] ELECTRONIC ENDOSCOPE SYSTEM FOR DISPLAYING UNCONNECTED SCOPE

[75] Inventor: Kazuhiro Yamanaka, Omiya, Japan

[73] Assignee: Fuji Photo Optical Co., Ltd., Saitama, Japan

[21] Appl. No.: 09/170,212

[22] Filed: Oct. 13, 1998

[30]    Foreign Application Priority Data

Dec. 11, 1997  [JP]   Japan .................................. 9-362026

[51] Int. Cl.[6] ........................................................ A61B 1/06
[52] U.S. Cl. ............................................ 600/118; 600/117
[58] Field of Search ................................ 600/103, 109, 600/117, 118, 136, 137, 142, 145, 152, 172, 174, 175, 112, 110; 340/501, 531, 661, 870.16

[56]              References Cited

U.S. PATENT DOCUMENTS

| | | | |
|---|---|---|---|
| 4,475,541 | 10/1984 | Takamatsu | 600/118 |
| 4,590,924 | 5/1986 | Tanikawa | 600/118 |
| 4,800,437 | 1/1989 | Hosoya | 348/207 |
| 4,996,975 | 3/1991 | Nakamura | 600/118 |
| 5,045,935 | 9/1991 | Kikuchi | 600/118 |
| 5,402,769 | 4/1995 | Tsuji | 600/109 |
| 5,490,015 | 2/1996 | Umeyama | 359/824 |
| 5,582,576 | 12/1996 | Hori | 600/118 |
| 5,609,560 | 3/1997 | Ichikawa | 600/118 |
| 5,830,121 | 12/1996 | Enomoto | 600/117 |

*Primary Examiner*—John P. Leubecker
*Assistant Examiner*—Ira Hatton
*Attorney, Agent, or Firm*—Snider & Chao; Ronald R. Snider

[57]              ABSTRACT

The present system is an electronic endoscope system capable of immediately deciding a trouble on scope connection and moreover easily obtaining ROM version information from the system. In the case of this system, a scope having a CCD is provided with a microprocessor and a processor unit for processing a signal is provided with a microcomputer and a ROM to communicate intrinsic data between the scope and the processor. In this case, the microcomputer decides imperfect connection of the scope and moreover decides a scope-connection error by detecting a fixed value for detection incorporated into communication data. Moreover, when there is imperfect connection of the scope or a connection error, a character message for prompting connection is displayed on the screen of a monitor. Furthermore, in this case, the version information of the ROM is displayed at the same time.

3 Claims, 3 Drawing Sheets

ELECTRONIC ENDOSCOPE SYSTEM FOR DISPLAYING UNCONNECTED SCOPE

BACKGROUND OF THE INVENTION

The application claims the priority of Japanese Patent Application No. 9-362026 filed on Dec. 11, 1997 which is incorporated herein by reference.

1. Field of the Invention

The present invention relates to an electronic endoscope system, particularly to an electronic endoscope system constituted so that a scope (electronic endoscope) is connected to a processor unit to display an unconnected scope.

2. Description of the Prior Art

An electronic endoscope system is constituted so that a scope (electronic endoscope) having a CCD (Charge Coupled Device) at its front end is connected to a processor unit for processing images by a connector and it is possible to set a plurality of scopes of the same type or a plurality of scopes of different types to the processor unit. Therefore, the data intrinsic to each scope on optical characteristics of an objective optical system or characteristic of a CCD is transmitted to a processor unit through communication.

The intrinsic data includes the information for colors and gains (amplification degrees) for image processing and the information for IDs (Identities). In the processor, predetermined image processing of video signals and processing for displaying images on a monitor screen are executed in accordance with these intrinsic data and moreover, operational functions of operating buttons are set.

In the case of the data communication between the scopes and the processor unit, intrinsic data may not be smoothly transmitted due to imperfect connection of a connector portion for connecting them. Therefore, the processor unit stores standard data for processing so that an image processed in accordance with the standard data is displayed on a monitor even under an imperfect-connection state. Therefore, when no intrinsic data is transmitted, the indication of the monitor frequently becomes an abnormal state and inversely, it is decided by the abnormal indication that connection is imperfect. Of course, no image is displayed unless a video signal is transmitted. Thereby, it is possible to know imperfect connection.

However, it can be hardly said that the above structure provides an easy manipulability because imperfect connection of a connector portion must be checked through the indication state of a monitor. Moreover, when the function of an operating button depends on the scope to be connected, a state is also considered in which a predetermined operation cannot be performed because intrinsic data is not communicated.

Furthermore, the following trouble may occur from the viewpoint different from the above mentioned. That is, setting of operational conditions to the above intrinsic data is performed in accordance with various data values (such as program, conditional value, and set value) stored in a ROM (Read Only Memory) set to the processor unit. In recent years, however, the version of the ROM is upgraded in accordance with the update of functions of an endoscope.

However, though the version information of the ROM is described in the specification, it is impossible to easily obtain the information from the system. The ROM version information is necessary to check the type of a scope which can be connected, decide whether a peripheral unit such as a printer can be connected, or replace the ROM and it is convenient if the version information can be easily obtained from the system.

SUMMARY OF THE INVENTION

The present invention is made to solve the above problems and its object is to provide an easily-manipulatable electronic endoscope system for displaying an unconnected scope and capable of immediately deciding imperfect connection of a scope and easily obtaining ROM version information from the system.

To achieve the above object, the present invention is characterized by being provided with communication means for communication data between a scope for observing the inside of an object to be observed and a processor unit for processing an image signal, decision means for deciding the imperfect-connection state of the scope or deciding the connection-error state of the scope in accordance with the communication data, and display control means for displaying a predetermined image showing an unconnected scope on a monitor screen when the imperfect-connection or connection-error state of the scope is decided by the decision means.

Moreover, another invention is characterized by incorporating a detection fixed value into communication data in order to decide the connection-error state.

Furthermore, still another invention is characterized in that the display control means displays the version data in a memory which is set to the above processor unit and in which the data for setting various operational conditions considering the intrinsic data concerned with each of the above scopes is stored together with the above image showing an unconnected scope.

According to the above structure, when communication data cannot be received for a data request to the scope side, it is possible to decide an imperfect-connection state (including a completely unconnected state). Moreover, a connection error is detected by incorporating a detection fixed value (data) into the transmission data of the intrinsic data of a scope. That is, by fetching the detection fixed value from received data and checking whether the value coincides with a correct value, it is decided that a connection error is detected when the value does not coincide with the received data. Moreover, the connection error can be detected through parity check or overrun check.

Moreover, under the imperfect-connection or connection-error state, a character image showing a message such as "please connect a scope" is displayed by the display control means. Furthermore, in the case of claim 3, a ROM version is displayed simultaneously with the character display. A ROM to be set to a processor unit has a program for matching with each unit and data such as a set value and a condition value corresponding to each scope and the ROM version also serves as a program version.

DETAILED DESCRIPTION OF THE PREFERRED EMBODIMENTS

Figure 1:
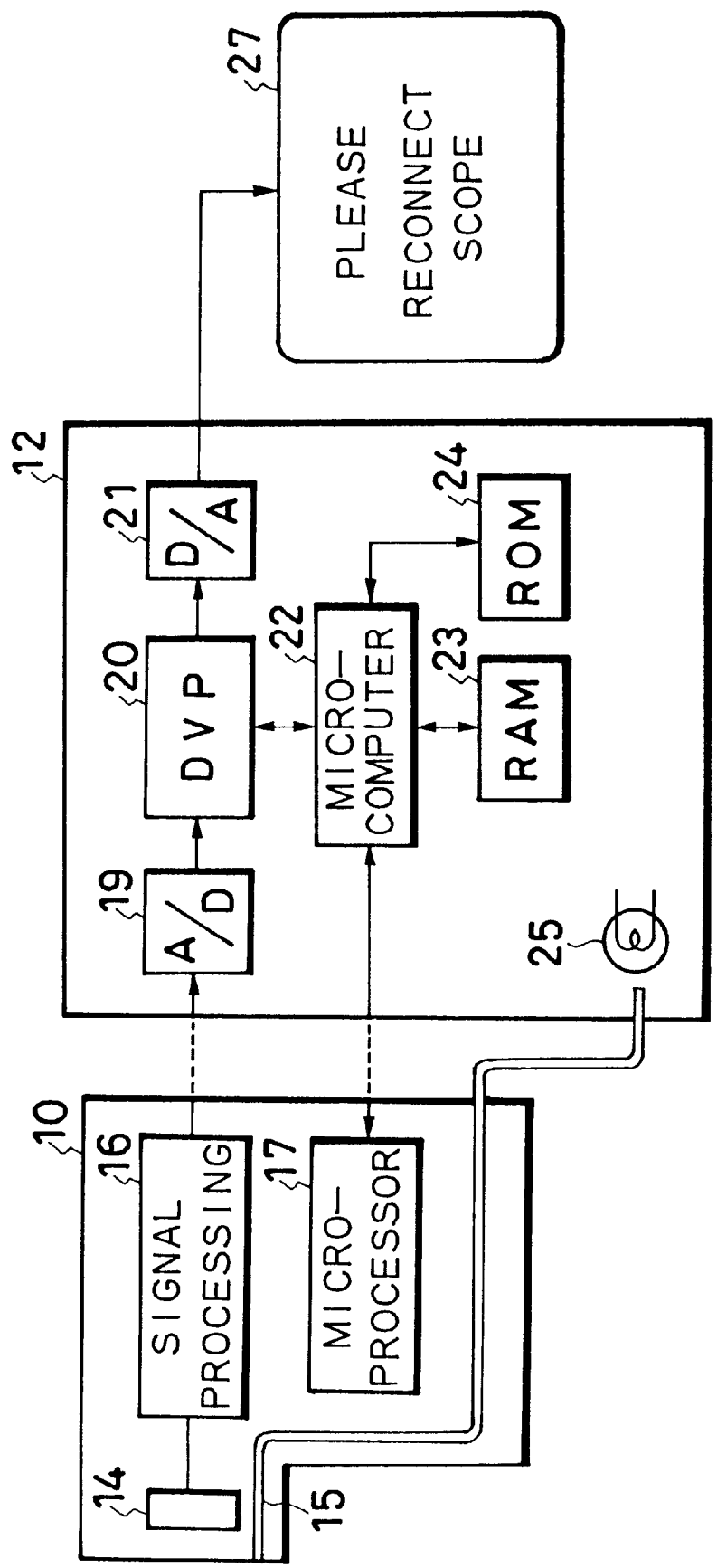
FIG. 1 is a block diagram showing the structure of the electronic endoscope system of an embodiment of the present invention for displaying an unconnected scope.

FIG. 1 shows the structure of the electronic endoscope system of the first embodiment of the present invention for displaying an unconnected scope. As shown in FIG. 1, a scope (electronic endoscope) 10 is connected to a processor unit 12 by a removable connector. A CCD 14 serving as an image pickup device is set to the front end of the scope 10 through a not-illustrated objective optical system and moreover, a light guide 15 for emitting irradiation light from the front end face is set to the front end.

A signal processing circuit 16 is provided so as to connect with the CCD 14, in which a video signal output from the CCD 14 is amplified by a CCD driving circuit or the like. Moreover, a microprocessor 17 is set to the scope 10, which performs communication control for transmitting the intrinsic data of the scope 10 to the processor unit 12.

Figure 2:
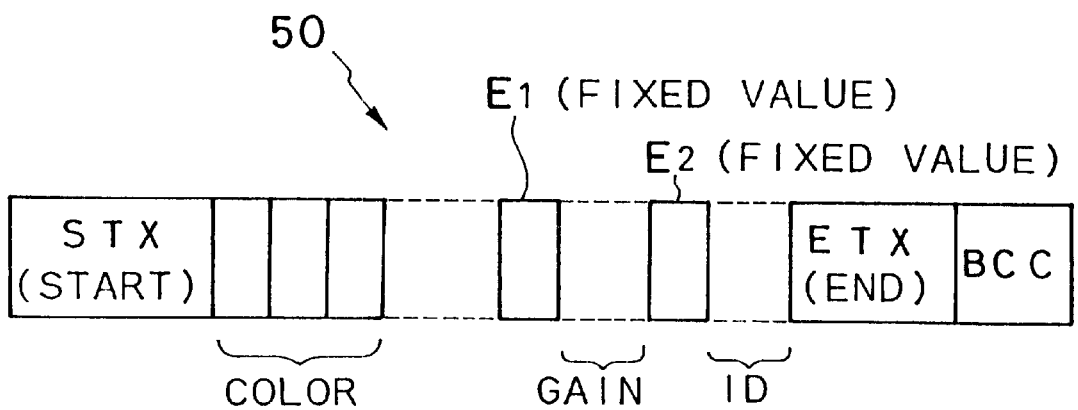
FIG. 2 is an illustration showing the structure of transmission data used for an embodiment.

FIG. 2 shows transmission data generated by the microprocessor 17. The transmission data 50 is data beginning with, for example, STX (start), including color data, gain data, and ID data which is the intrinsic data of a scope, and ending with ETX (end) and BCC (block check code) to which a vertical parity is assigned. Fixed values E1 and E2 such as numerical values for detecting connection errors can be incorporated into the transmission data 50 as illustrated. These fixed values E1 and E2 are used as data for deciding whether transmission is normally performed by being compared with fixed values previously stored in the processor unit 12.

The processor unit 12 includes an A-D converter 19, a DVP (Digital Video Processor) 20 for processing various images of video signals, and a D-A converter 21. Moreover, the processor unit 12 is provided with a microcomputer 22 for executing various controls such as communication control and decision of imperfect connection or connection errors and processing an image or setting an operating button in accordance with color data and gain data transmitted from the scope 10. The microcomputer 22 is provided with a RAM (Random Access Memory) 23 and a ROM (Read Only Memory) 24. The ROM 24 stores a program and various data for executing a predetermined setting correspondingly to various scopes.

Figure 3:
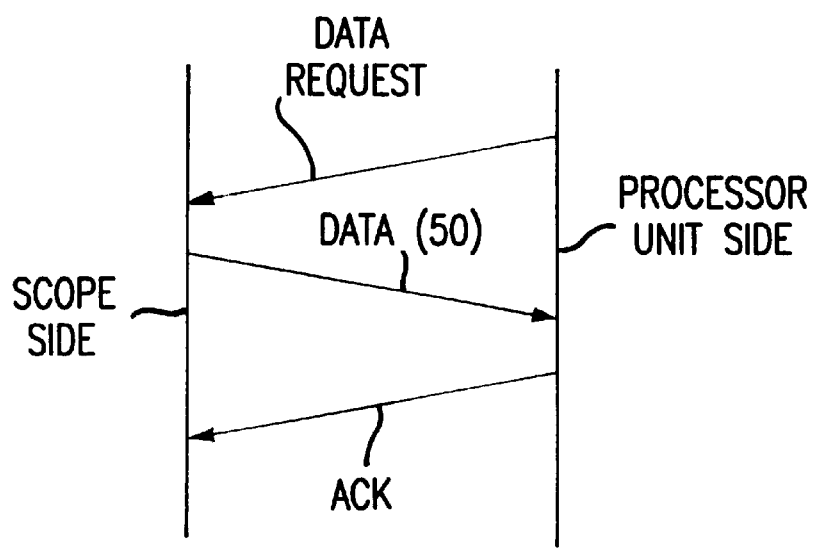
FIG. 3 is an illustration showing the communication state between scope side and processor side in FIG. 1.

That is, the microcomputer 22 makes a request for the transmission of intrinsic data to the scope side when the power supply of the processor unit 12 is turned on as shown in FIG. 3. In this case, unless transmission data is received, the microcomputer 22 decides imperfect connection. However, when the microcomputer 22 receives the transmission data 50 from the microprocessor 17 shown in FIG. 2, it extracts the fixed values E1 and E2, temporarily stores them in the RAM 23, and checks if these values match with the fixed data stored in the ROM 24. When the values coincide with the fixed data, the microcomputer 22 decides that the values are normal. However, when the values do not coincide with the fixed data, it decides a connection error.

Moreover, the microcomputer 22 compares a transmitted BCC (block check code) with the vertical parity and decides a connection error unless they coincide with each other. Furthermore, in the case of this example, the horizontal parity and overrun are checked at the same time. When an error is present in them, the microcomputer 22 decides the error as a connection error.

A light source 25 for supplying light to the light guide 15 is also set into the processor unit 12. Moreover, a television monitor 27 for displaying the image inside an object to be observed obtained by the CCD 14 is connected to the processor unit 12, in which an image showing the unconnected scope is displayed. That is, when the scope 10 is under an imperfect-connection state or connection-error state, the microcomputer 22 outputs a command signal for unconnected image display to the DVP 20 which generates, for example, a message "PLEASE RECONNECT SCOPE" (character image) and outputs it to the monitor 27.

The first embodiment comprises the above structure. When the power supply of the processor unit 12 is turned on, the processor unit 12 makes a request for the transmission of data to the microprocessor 17 of the scope 10 from the microcomputer 22 as shown in FIG. 3. Moreover, when the processor unit 12 cannot receive transmission data 50 from the scope 10 at all, the microcomputer 22 decides an imperfect-connection (or unconnected) state and outputs an unconnected-image display command to the DVP 20. Thereby, characters "PLEASE RECONNECT SCOPE" are displayed on the monitor 27 as shown in FIG. 1.

Figure 4:
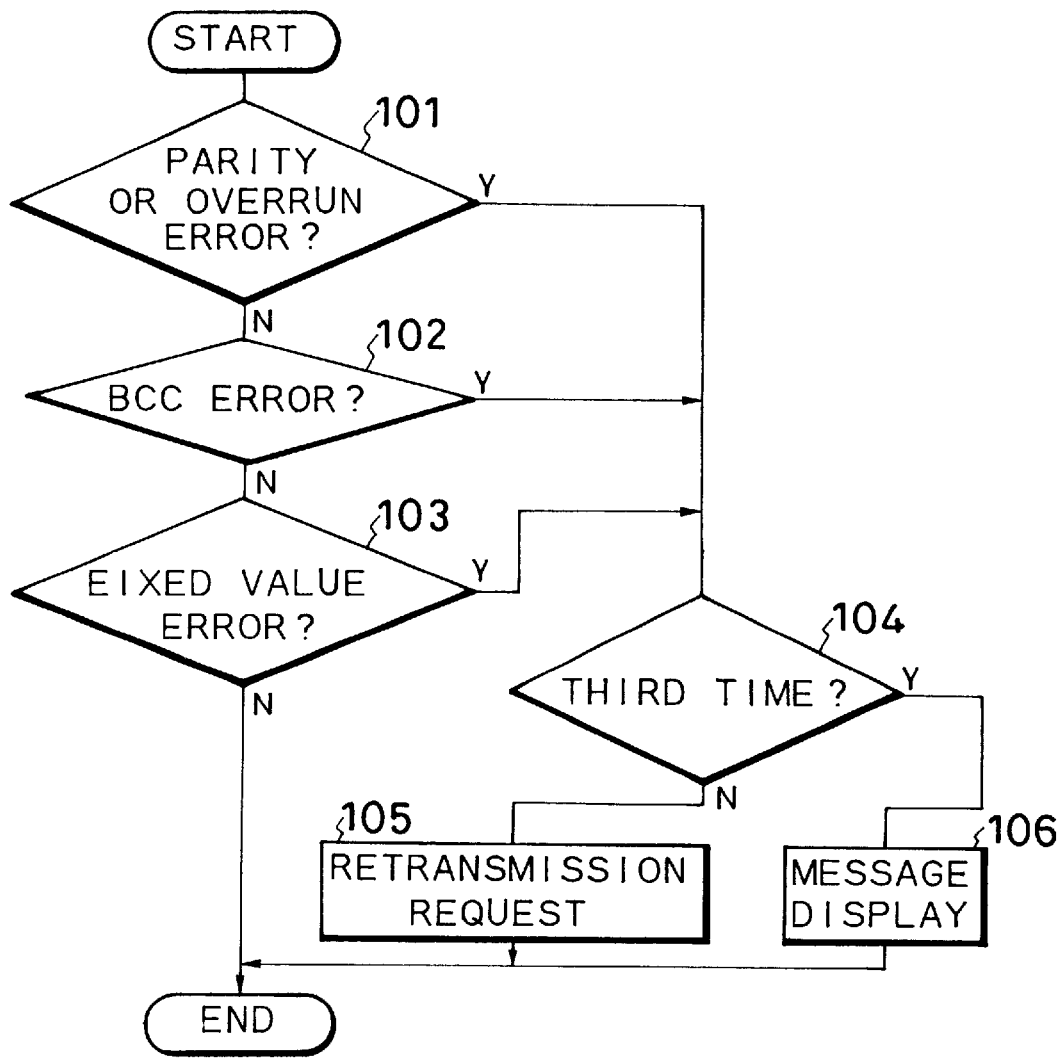
FIG. 4 is a flowchart showing the control operation of a microcomputer at the processor unit side in FIG. 1.

However, when the processor unit 12 receives the transmission data 50, the microcomputer 22 decides whether there is a connection error in accordance with FIG. 4. That is, it is decided whether there is mismatch of horizontal parity or overrun in the transmission data 50 in step 101, whether there is mismatch of BCC in step 102, and whether there is mismatch of the fixed values E1 and E2 in step 103. Moreover, in the case of "YES" because an error occurs in any one of these steps 101 to 103, step 104 is started.

In step 104, it is decided whether the above error occurs three times. In the case of "NO", a request for retransmission is made to the scope 10 in step 105. In the case of "YES", a command for unconnected designation image display (message display) is output in step 106. Therefore, in the case of this embodiment, retransmission is requested three times when an error occurs and when the third-time error is detected, the message "PLEASE RECONNECT SCOPE" is displayed on the monitor 27.

Unless any error is detected in the above steps 101, 102, and 103, the decision operation is ended and ACK (affirmative response) is output to the scope 10 as shown in FIG. 3.

Figure 5:
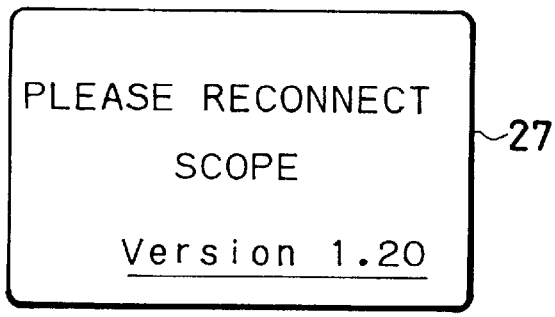
FIG. 5 is an illustration showing a monitor screen of second embodiment of unconnected scope display.

FIG. 5 shows a display state by the monitor 27 of the second embodiment. The second embodiment displays the version information of the ROM 24 provided for the processor unit 12 in the unconnected designation image display described above. That is, the ROM 24 shown in FIG. 1 stores its version information. When the microcomputer 22 decides that the scope 10 is under an imperfect-connection or connection-error state, it reads the version data from the ROM 24 and outputs the data to the DVP 20.

Thus, because the DVP 20 generates an image in which the characters "Version 1.20" are added to "PLEASE RECONNECT SCOPE", a message for prompting connection is displayed on the screen of the monitor 27 in FIG. 5 together with the version information.

The second embodiment has an advantage that it is possible to easily know the version (particularly, stored program version) information of the ROM 24 by turning on the power supply of the processor unit 12 without connecting the scope 10. That is, as described above, unless the scope 10 is connected, imperfect connection is decided and a message including version information is displayed.

Display of the version information is effective to check the type of the scope 10 which can be connected to the processor unit 12, decide whether a peripheral unit such as a printer or VTR can be connected, and replace the ROM 24. In the case of this embodiment, ROM version information can be displayed according to necessity without using any special switch. Therefore, the manipulability is improved.

In the case of the above embodiments, a character message is displayed as an image for showing an unconnected scope. However, it is also possible to warn the state of an unconnected scope by changing the color of a screen to a particular color (e.g. blue) or displaying a particular diagram (e.g. blue circle).

As described above, the present invention makes it possible to immediately decide imperfect connection of a scope. Moreover, because a fixed value for detecting an error is incorporated into communication data, there is an advantage that a connection error is securely decided. Furthermore, when a trouble occurs in connection, it is possible to easily check the program version of a ROM and moreover, know version information without using any special switch.

What is claimed is:

1. An electronic endoscope system comprising:

communication means for communicating data communication between a scope for observing the inside of an object to be observed and a processor unit for processing an image signal;

decision means for deciding an imperfect-connection state of said scope or deciding a connection-error state of said scope in accordance with said communication data; and display control means for displaying a predetermined image showing an unconnected scope on a monitor screen when the imperfect-connection or connection-error state of said scope is decided by the decision means.

2. The electronic endoscope system for displaying an unconnected scope according to claim 1, wherein a fixed value for detection is incorporated into communication data in order to decide said connection-error state.

3. The electronic endoscope system for displaying an unconnected scope according to claim 1, wherein said display control means displays the version data of a memory which is set to said processor unit and in which the data for setting various operational conditions considering the intrinsic data for each of said scopes is stored together with the image showing said unconnected scope.

* * * * *